Oct. 19, 1937.    W. H. FRANK ET AL    2,096,580
FUSE CLIP
Filed Dec. 19, 1934    2 Sheets—Sheet 1

INVENTORS,
William H. Frank
& Joseph A. Messing
BY Daniel G. Cullen
ATTORNEY.

Oct. 19, 1937.   W. H. FRANK ET AL   2,096,580
FUSE CLIP
Filed Dec. 19, 1934   2 Sheets-Sheet 2

INVENTORS.
William H. Frank
BY & Joseph A. Messing
Daniel B. Cullen ATTORNEY.

Patented Oct. 19, 1937

2,096,580

UNITED STATES PATENT OFFICE 2,096,580

FUSE CLIP

William H. Frank and Joseph A. Messing, Detroit, Mich., assignors to Bulldog Electric Products Company, Detroit, Mich., a corporation of West Virginia Application December 19, 1934, Serial No. 758,246

14 Claims. (Cl. 200—134)

The inventions of this application relate to fuse holding means, hereafter referred to as holders and sometimes known as clips.

Figure 1:
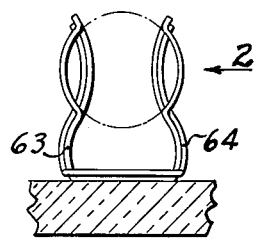
Figure 2:
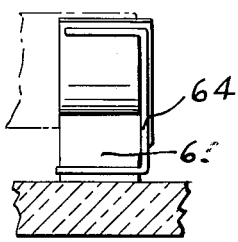
Figures 3, 4:
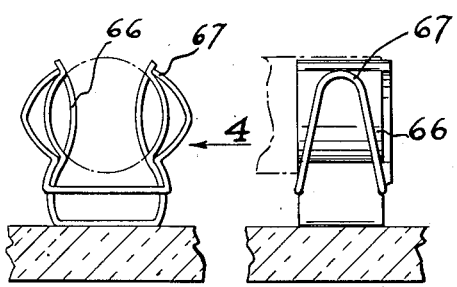
Figure 5:
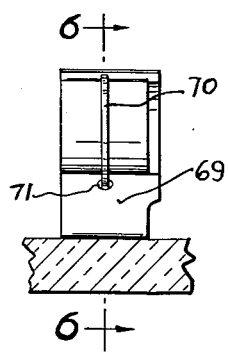
Figure 6:
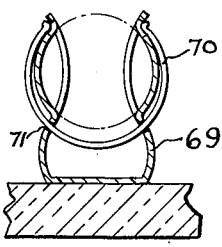

The inventions are embodied in fuse holders of various configurations and characteristics, and a selected few of these embodiments are shown in the appended drawings, in which Figs. 1 and 2, 3 and 4, 5 and 6, 7 and 8, 9 and 10, 11 and 12, 13 and 14, 15 and 16, 17 and 18, 19 and 20, and 21 and 22 are elevation and side views, in pairs, of eleven different forms of fuse clips having spring wire holding means;

Figs. 2, 4, and 6 are views as if in the direction of the arrows 2, 4, and 6 of Figs. 1, 3, and 5.

Spring wire holding means

In Figs. 1–10 are shown spring wire holding means adapted for use with standard or conventional fuse clips, the wires serving to reinforce the clip and being held on by their own resilience, the wire further acting as end stops for the fuses.

In Figs. 1–2 there is shown a fuse clip having leaves 63 adapted to be moved towards each other by the spring wire 64, the latter being generally U-shaped when viewed from the side, as in Fig. 2.

In Figs. 3–4 the clip leaves 66 are shown as reinforced by a wire bent to form two inwardly humped U's superposed upon each other and joined at the place indicated by the numeral 67, the bases of the U's being disposed on opposite ends of the fuse clip, substantially as shown.

In Figs. 5–6 the contact leaves 69 are shown as reinforced by a wire 70 in the form of a round U and passed through aligned apertures 71 of the leaves, the wire tending to resist expansion of itself and of the leaves.

Figures 7, 8:
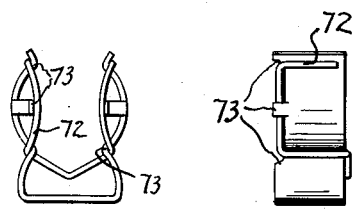

In Figs. 7–8 the wire 72 is shown as threaded through lugs 73, three on each side of the clip, these serving to hold the wire in place on the holder.

Figures 9, 10:
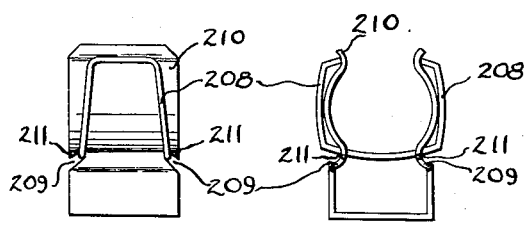

In Figs. 9–10 four legs of the wire 208 are shown as secured in four slots 209 on the four vertical edges of the U-shaped clip 210, and the lugs 211 forming lips of these slots are shown as bent in towards the opposite sides of the slots to close them partially and restrain movement of the wire legs out of the slots.

Figures 11, 12:
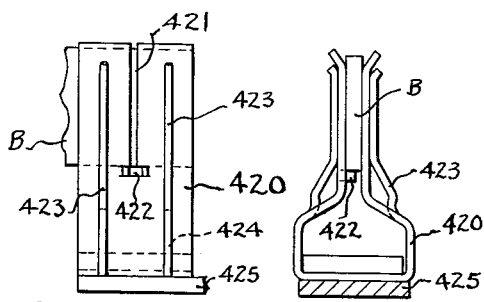

In Figs. 11 and 12 there is shown a contact having a copper U strap 420, both of whose uprights are laminated by a slot 421, and one of whose uprights is provided with an inwardly bent lug 422 which forms a stop for the blade end B of a fuse inserted into the contact. The copper strap is reinforced by U-shaped steel wire springs 423 bent around the contact strap 420, the bights of the wires being confined within the cross section of the bight of the strap in slots 424, cut in the sides and bottom of the strap.

This feature insures the creation of a direct copper-to-copper contact between the bight of the copper strap 420 and the copper base plate 425, to which the contact is to be assembled, without the possibility of interference or separation caused by the presence of the steel wires 423.

The importance of having the steel spring wires 423 embedded within the confines of the strap 420, particularly near the bight of the latter, cannot be over-estimated. A contact of this character will have the advantages gained by the presence of the steel reinforcing wires 423 without at the same time sacrificing direct electrical copper-to-copper contact between the bight of the strap 420 and the base plate 425, as contradistinguished from what occurs with other types of steel spring wire reinforced contacts. Further, the frictional and interlocking engagement of the spring wires with the walls of the slots in which they are disposed, prevents facile separation of the wires from the strap, and insures their remaining in engagement, despite shocks encountered by the contacts during the time they are being distributed, stocked, and sold, and before they are assembled to the base plates.

Further, the interlocking engagement between the wires and the copper strap is such as to permit facile removal and replacement of wires to straps in the event of injury to the wires during use.

Figures 13, 14:
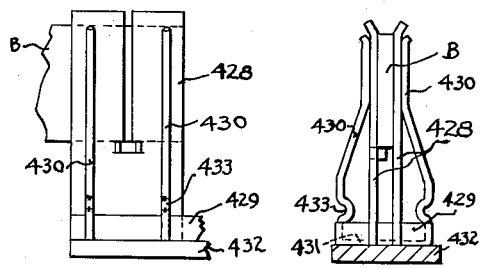

Figs. 13 and 14 show a modification of the contact of Figs. 11 and 12, in which the contact proper, namely, the copper parts, include separate blade embracing leaves 428, embedded within slots in a base 429. Steel U-shaped spring wires 430 embrace the leaves 428 and the base 429, and their bights are disposed within slots 431 on the under surface of the base 429, so that they will not interfere with the desired copper-to-copper contact between the base 429 and the copper base plate 432. Further, the spring wires 430 are so formed that they tightly embrace the leaves 428, and are further provided with indentations 433, seated over the edges of the base 429, to form an effective anchorage for the spring wires with respect to such base.

Figures 15, 16:
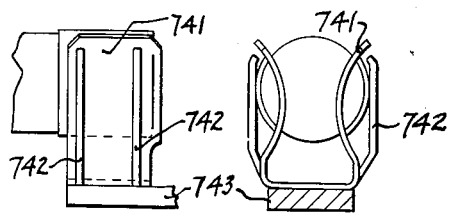

Figs. 15 and 16 show a copper contact strap 741 of conventional construction but provided with slots in its bight and in the adjacent fillets. These receive the bights of U-shaped steel spring wires 742 which embrace the sides of the contact strap 741 and move them towards each other. The provision of the slots in the base insures the bights of the wires from preventing contact between the bight of the strap and the copper base plate 743, and also provides an effective mechanical interlock between the copper strap 741 and the steel wires 742 such that the contacts when sold and shipped, as they are, removed from their base straps 743, will not become disassembled. That is to say, the wires 742 will not separate from the straps 741 despite disturbances incident to shipment, storage, and sale of U-shaped contacts.

This construction prevents the spring wires 742 from working out of proper position with respect to the strap 741, and yet does not prevent ready removal and replacement of the wires, if they become broken or weakened.

Figures 17, 18:
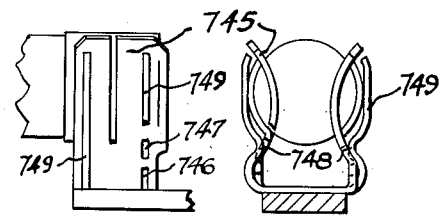

In Figs. 17 and 18 the copper strap 745 is similar to the strap 741 of Figs. 15 and 16, in that it has slots 746 at its bight and fillets. However, it also has side slots 747 separated from the slots 746 which receive indented portions 748 of the steel embracing wires 749. The provision of slots 747 and indentations 748 creates a more effective interlock between the strap and the wires, one that will exist even though the copper strap has collapsed to such an extent that its end edges are quite clear of the ends of the wires.

Figures 19, 20:
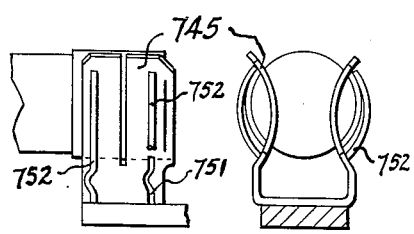

In Figs. 19 and 20 the slots 751, of the strap, and the wires 752 are zig-zagged as shown, to create another type of interlock.

In both of the two last mentioned forms, the wires are applied to the strap from in back of the bight thereof, and once hooked onto the strap cannot readily be removed therefrom, for they must be sprung out before they can be pulled off the strap.

Figures 21, 22:
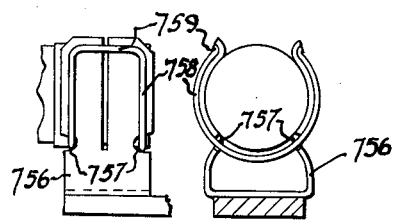

In Figs. 21 and 22 the copper strap 756 is shown as having notches 757 in its end edges and in these is received the steel wire 758, the latter being of double U form, with its major bight in the notches, and with one minor bight 759 connecting the two U portions at one side, the wire having split ends partially connecting the two U portions at the other side.

The wire is retained on the strap 756 and in the notches 757 by the tension of the wire itself, and may be readily applied to or removed from a strap 756 for replacement, the notches creating a better interlock between the wire and the strap than would be the case if the notches were omitted.

This application is a continuation in part of application Serial No. 685,824 filed August 19, 1933, now Patent No. 1,988,171 of January 15, 1935, and also of application Serial No. 601,332 filed March 26, 1932, now Patent No. 1,988,170 of January 15, 1935.

We claim:

1. A fuse holding device comprising a clip formed with a pair of yielding arms having terminals curving toward each other, and a detachable spring element comprising a yoke portion terminating in parallel spaced fingers removably seated in the concave outer faces of said clip terminals and thereby substantially prevented from any canting movement while operating to actuate said arms into yielding engagement with the fuse, the ends of said fingers being formed with hooks in detachable retaining engagement with the edges of said arms.

2. A fuse holding device comprising a clip formed with a pair of yielding arms having terminals curving toward each other, and a spring element comprising a yoke portion looping the space beneath the fuse and terminating in spaced fingers detachably engaging said clip terminals traversing the outer faces thereof for actuating said arms into yielding engagement with the fuse and including latching elements operative by detachable engagement with said clip arms to prevent casual disengagement of said fingers from said arms.

3. A fuse holding device comprising a pair of yielding arms for engagement with opposite sides of the fuse, a detachable spring element comprising a yoke portion looping the space beneath the fuse and formed with a pair of spaced fingers removably engaging the outer sides of said arms for actuating the latter into yielding clamping engagement with the fuse, and hooks formed on the ends of said fingers for detachable retaining engagement with the side edges of said arms.

4. A fuse holding device comprising a clip formed with a pair of yielding arms having terminals curving toward each other, and a readily detachable and demountable spring element comprising a yoke portion spanning the space between said clip arms and terminating in parallel spaced fingers removably seated in the concave outer faces of said clip terminals and thereby substantially prevented from any canting movement while operating to actuate said arms into yielding engagement with the fuse.

5. A fuse holding device comprising a U clip of sheet metal and a one piece wire spring element comprising two U portions, one at each end of and outside of the clip, and two cross portions, each connecting a terminal of one U portion to a terminal of the other U portion.

6. A fuse holding device comprising a U clip of sheet metal and a one piece wire spring element comprising two U portions, one at each end of and outside of the clip, and two cross portions, each connecting a terminal of one U portion to a terminal of the other U portion, the clip having portions formed to lie over the wire spring element and thus interlock it to the clip.

7. A fuse holding device comprising a U clip of sheet metal and a one piece wire spring element comprising two U portions, one at each end of and outside of the clip, and two cross portions, each connecting a terminal of one U portion to a terminal of the other U portion, the clip having edge notches in which are disposed the wire spring element.

8. A fuse holding device comprising a U clip of sheet metal and a one piece wire spring element comprising two U portions, one at each end of and outside of the clip, and two cross portions, each connecting a terminal of one U portion to a terminal of the other U portion, the clip having edge notches in which are disposed the wire spring element, and having portions formed to close the notches when the element lies therein and thus interlock the wire spring element therein.

9. A fuse holding device comprising a U clip of sheet metal and a one piece wire spring element comprising two U portions, one at each end of and outside of the clip, and two cross portions, each connecting a terminal of one U portion to a terminal of the other U portion, the wire spring element being so formed that it has a tendency to resist relative separation of its cross portions, whereby the element restrains relative separation of the ends of the U clip.

10. A fuse holding device comprising a U clip of sheet metal, and a one piece wire spring element comprising a U portion embracing the clip and outside the latter, and two cross portions, each connected to a terminal of the U portion.

11. A fuse holding device comprising a U clip of sheet metal, and a one piece wire spring element comprising a U portion embracing the clip and outside the latter, and two cross portions, each connected to a terminal of the U portion, the clip having portions formed to lie over the wire spring element and thus interlock it to the clip.

12. A fuse holding device comprising a U clip of sheet metal, and a one piece wire spring element comprising a U portion embracing the clip and outside the latter, and two cross portions, each connected to a terminal of the U portion, the clip having edge notches in which are disposed the wire spring element.

13. A fuse holding device comprising a U clip of sheet metal, and a one piece wire spring element comprising a U portion embracing the clip and outside the latter, and two cross portions, each connected to a terminal of the U portion, the clip having edge notches in which are disposed the wire spring element, and having portions formed to close the notches when the element lies therein and thus interlock the wire spring element therein.

14. A fuse holding device comprising a U clip of sheet metal, and a one piece wire spring element comprising a U portion embracing the clip and outside the latter, and two cross portions, each connected to a terminal of the U portion, the wire spring element being so formed that it has a tendency to resist relative separation of its cross portions, whereby the element restrains relative separation of the ends of the U clip.

JOSEPH A. MESSING.
WILLIAM H. FRANK.